United States Patent
Ota et al.

(10) Patent No.: US 8,409,520 B2
(45) Date of Patent: Apr. 2, 2013

(54) OZONE CONCENTRATOR

(75) Inventors: Koji Ota, Tokyo (JP); Yasuhiro Tanimura, Tokyo (JP); Yoichiro Tabata, Tokyo (JP); Yujiro Okihara, Tokyo (JP); Tetsuya Saitsu, Tokyo (JP); Noriyuki Nakamura, Tokyo (JP); Ryohei Ueda, Tokyo (JP)

(73) Assignees: Mitsubishi Electric Corporation, Tokyo (JP); Toshiba Mitsubishi-Electric Industrial Systems Corporation, Tokyo (JP)

( * ) Notice: Subject to any disclaimer, the term of this patent is extended or adjusted under 35 U.S.C. 154(b) by 137 days.

(21) Appl. No.: 12/743,984

(22) PCT Filed: Nov. 28, 2008

(86) PCT No.: PCT/JP2008/071703
§ 371 (c)(1),
(2), (4) Date: May 20, 2010

(87) PCT Pub. No.: WO2009/069772
PCT Pub. Date: Jun. 4, 2009

(65) Prior Publication Data
US 2010/0266463 A1   Oct. 21, 2010

(30) Foreign Application Priority Data

Nov. 30, 2007  (JP) .................................. 2007-311113

(51) Int. Cl.
*B01J 19/08* (2006.01)
(52) U.S. Cl. ......... 422/186.11; 96/121; 96/108; 96/122; 96/127; 96/130; 95/101; 95/115; 95/11; 95/21; 95/138
(58) Field of Classification Search .............. 422/186.11; 96/108, 121, 122, 127, 130; 95/101, 115, 95/138, 11, 21
See application file for complete search history.

(56) References Cited

U.S. PATENT DOCUMENTS 5,730,783 A * 3/1998 Sanui et al. ..................... 95/115
(Continued)

FOREIGN PATENT DOCUMENTS

| JP | 50 116390 | 9/1975 |
| JP | 63 159202 | 7/1988 |
| JP | 9 235104 | 9/1997 |
| JP | 11 92115 | 4/1999 |
| JP | 11 292514 | 10/1999 |

(Continued)

OTHER PUBLICATIONS

U.S. Appl. No. 12/745,595, filed Jun. 1, 2010, Tabata, et al.

*Primary Examiner* — Xiuyu Tai
(74) *Attorney, Agent, or Firm* — Oblon, Spivak, McClelland, Maier & Neustadt, L.L.P.

(57) ABSTRACT

Provided is an ozone concentrator including an ozone generator (3), adsorption/desorption columns (4) in which silica gel (6) cooled with a certain-temperature refrigerant (25) for concentrating ozone generated by the ozone generator (3) is packed, a refrigerating machine (23) for cooling the refrigerant (25), a vacuum pump (20) for enhancing a concentration of the ozone in one of the adsorption/desorption columns (4) by discharging mainly oxygen from the silica gel (6) adsorbing the ozone, a plurality of valves (8) to (13) for air pressure operations, for switching passages of gas that is allowed to flow in or flow out with respect to the adsorption/desorption columns (4), and ozone concentration meters (28, 29) for measuring the concentration of the ozone enhanced by the vacuum pump (20), in which a discharge line of the vacuum pump (20) is connected to another one of the adsorption/desorption columns (4), whereby the ozone is allowed to pass through another one of the adsorption/desorption columns again. Therefore, stable ozone of high concentration can be generated at a satisfactory energy efficiency without any temperature difference between upper and lower positions of adsorption/desorption columns.

10 Claims, 6 Drawing Sheets

U.S. PATENT DOCUMENTS 5,846,298 A * 12/1998 Weist, Jr. .................... 95/138
6,254,763 B1    7/2001 Izumi et al.
6,344,130 B1 * 2/2002 Koike et al. .................... 205/626
6,495,109 B1 * 12/2002 Tanimura et al. ........ 422/186.07

FOREIGN PATENT DOCUMENTS

| JP | 2000 72408 | 3/2000 |
| JP | 2004 277284 | 10/2004 |

* cited by examiner

OZONE CONCENTRATOR

TECHNICAL FIELD

The present invention relates to an ozone concentrator that concentrates ozone generated by an ozone generator to produce ozone of high concentration.

BACKGROUND ART

In recent years, ozone has been used for a variety of purposes such as cleaning of a silicon wafer used in a semiconductor device, water supply and sewerage treatment, and the like. In cleaning of a silicon wafer, ozone water in which ozone gas is dissolved in pure water is used as a cleaning solution, and hence an organic substance or noble metal on a silicon wafer is removed by using the ozone water together with dilute hydrofluoric acid aqueous solution or the like.

It is difficult to store ozone gas in a state of gas due to the strong self-decomposition property thereof, and ozone gas is generally generated for use by an ozone generator in the vicinity of an ozone-using facility.

A conventional method of concentrating ozone includes an adsorption step of allowing an adsorbent cooled by a refrigerating machine to saturation-adsorb ozone gas generated by an ozone generator in an atmospheric state, a purification step of discharging, under a reduced pressure, an adsorption pipe containing the adsorbent to a partial pressure of supply ozone gas, and an elimination step of supplying ozone of high concentration with a pressure difference by communicating the ozone to an ozone-using facility kept in a vacuum state, while keeping a cooled state and a reduced-pressure state in the adsorption pipe (for example, see Patent Document 1).

Further, as another conventional method of concentrating ozone, the following has been proposed: an apparatus includes three adsorption towers filled with an adsorbent, a cooling device for cooling the adsorption towers, a heater for controlling the temperature of the adsorption towers, an open/close valve for changing an ozone passage, an ozone storage container for storing desorbed ozone, and a mass-flow controller for adjusting the flow rate of ozone to be supplied from the ozone storage container to an ozone-using facility, and four steps of an ozone adsorption step, a stabilizing and boosting step, an ozone desorption step, and a cooling step are repeated and the operation of each adsorption/desorption column is shifted by ⅓ cycle to generate ozone of a concentration of 28.4 vol % continuously (for example, see Patent Document 2).

Further, in a conventional discharge-type ozone generator, several % of nitrogen is mixed in oxygen gas to stabilize the generation of ozone (for example, see Patent Document 3).
Patent Document 1: JP 2002-68712 A
Patent Document 2: JP 11-335102 A
Patent Document 3: JP 2001-180915 A

DISCLOSURE OF THE INVENTION

Problem to be Solved by the Invention

According to such a conventional method of concentrating ozone, there is a problem that ozone is discharged uselessly because vacuum discharging is performed so as to obtain concentrated ozone.

There is also a problem that, because the cooling step is provided after the stabilizing and boosting step and the desorption step, there is a time loss other than that for adsorption/desorption, and a temperature difference occurs at upper and lower positions of the adsorption towers, which increases an energy loss.

The present invention has been achieved so as to solve such problems, and provides an apparatus for generating stable concentrated ozone at a satisfactory energy efficiency without a temperature difference between upper and lower positions of adsorption/desorption columns.

Means for Solving the Problems

The present invention provides an ozone concentrator including an ozone generator, a plurality of adsorption/desorption columns in which an ozone adsorbent cooled with a certain-temperature refrigerant for concentrating ozone generated by the ozone generator is packed, cooling means for cooling the refrigerant, a vacuum pump connected to the plurality of adsorption/desorption columns, for concentrating the ozone in the plurality of adsorption/desorption columns by discharging mainly oxygen from the adsorbent adsorbing the ozone; and a plurality of valves for air pressure operations connected to the adsorption/desorption columns, for switching passages of gas that is allowed to flow in or flow out with respect to the adsorption/desorption columns, in which a discharge line of the vacuum pump that concentrates the ozone in one of the plurality of adsorption/desorption columns in which the adsorbent is packed is connected to another one of the plurality of adsorption/desorption columns, whereby discharge gas discharged from the vacuum pump is allowed to pass through the another one of the plurality of adsorption/desorption columns again.

Effects of the Invention

The present invention provides an ozone concentrator including an ozone generator, a plurality of adsorption/desorption columns in which an ozone adsorbent cooled with a certain-temperature refrigerant for concentrating ozone generated by the ozone generator is packed, cooling means for cooling the refrigerant, a vacuum pump connected to the adsorption/desorption columns, for concentrating the ozone in the adsorption/desorption columns by discharging mainly oxygen from the adsorbent adsorbing the ozone, a plurality of valves for air pressure operations, connected to the adsorption/desorption columns, for switching passages of gas that is allowed to flow in or flow out with respect to the adsorption/desorption columns, and an ozone concentration meter for measuring a concentration of the ozone concentrated by the vacuum pump, in which a discharge line of the vacuum pump that concentrates the ozone in one of the adsorption/desorption columns in which the adsorbent is packed is connected to another one of the adsorption/desorption columns, whereby the ozone is allowed to pass through the another one of the adsorption/desorption columns again. Therefore, stable ozone of high concentration can be generated at a satisfactory energy efficiency without any temperature difference between upper and lower positions of adsorption/desorption columns.

BEST MODE FOR CARRYING OUT THE INVENTION

Embodiment 1

Figure 1:
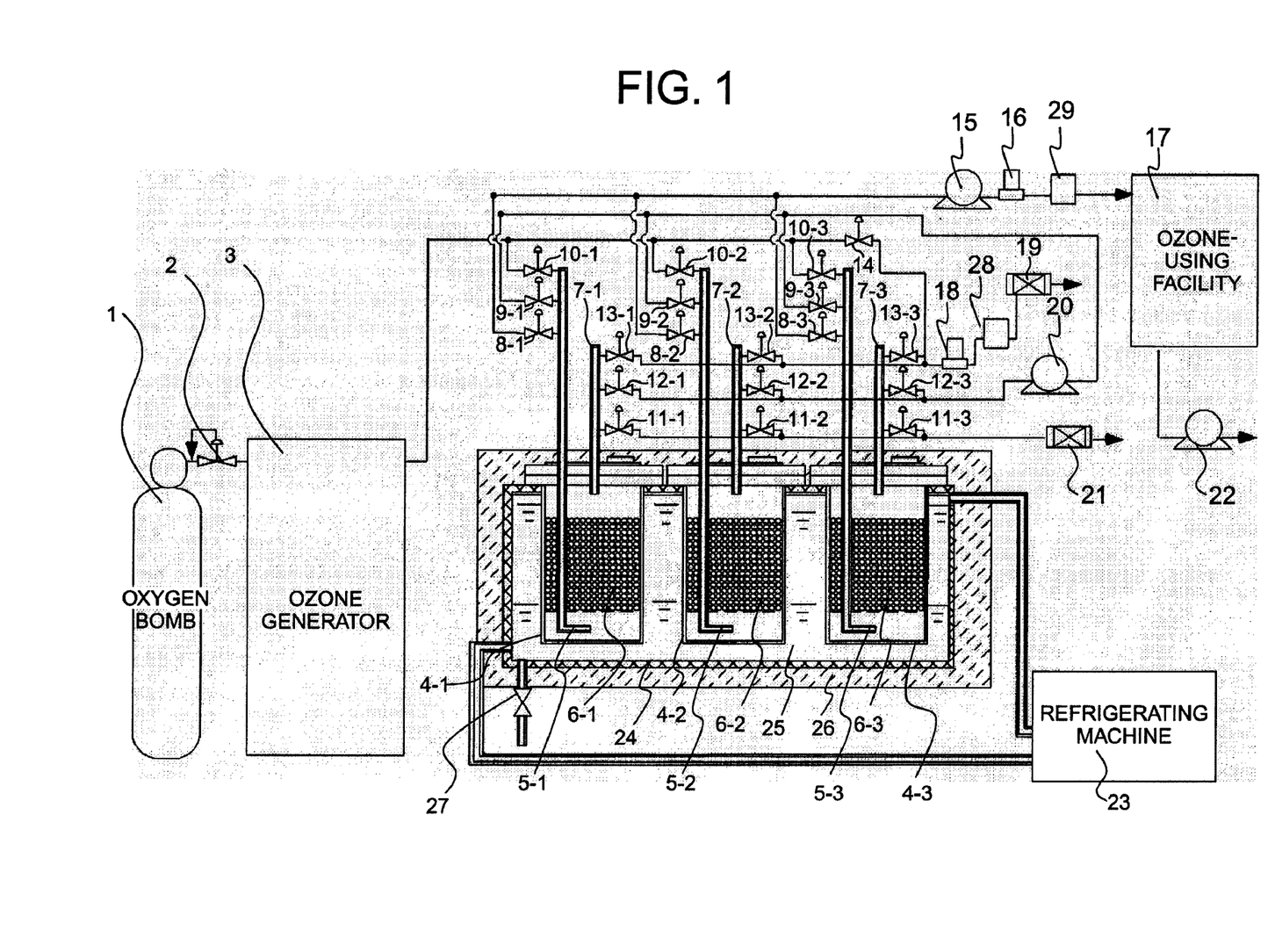
FIG. 1 A structural view illustrating a configuration of an ozone concentrator according to Embodiment 1 of the present invention.

FIG. 1 is a view illustrating an ozone concentrator according to Embodiment 1 of the present invention. As illustrated in FIG. 1, the ozone concentrator according to Embodiment 1 of the present invention is provided with three adsorption/desorption columns 4. In FIG. 1, although the adsorption/desorption columns are denoted with reference numerals 4-1, 4-2, and 4-3, respectively, they are described collectively as reference numeral 4 in the following description. In the same way as in the other configurations, X-1 denotes a member provided so as to correspond to the adsorption/desorption column 4-1, X-2 denotes a member provided so as to correspond to the adsorption/desorption column 4-2, and X-3 denotes a member provided so as to correspond to the adsorption/desorption column 4-3, and they are collectively denoted simply as X (herein, X indicates numbers of 5 to 13).

Returning to FIG. 1, the three adsorption/desorption columns 4 are contained in a cooling tank 24 the outside of which is covered with a heat-insulating material 26. In each adsorption/desorption column 4, a silica gel 6 is placed as an ozone adsorbent. As illustrated in FIG. 1, the silica gel 6 is placed only in a center portion in a height direction so that spaces are formed in upper and lower portions of the adsorption/desorption column 4. The silica gel 6 has a particulate, desirably, spherical shape with a diameter of 1 to 5 mm, and fills the adsorption/desorption column 4 so as to form a complementary shape with respect to an inner wall of the adsorption/desorption column 4 (if the inner wall has a cylindrical shape, the silica gel 6 has a columnar shape) and to come into close contact with the inner wall of the adsorption/desorption column 4. A refrigerating machine 23 is connected to the cooling tank 24, and a refrigerant 25 cooled to a predetermined temperature by the refrigerating machine 23 circulates in the cooling tank 24. The silica gel 6 is always cooled with the refrigerant 25. Further, a drain valve 27 is provided at a bottom portion of the cooling tank 24 so as to penetrate the heat-insulating material 26, and if required (for example, for maintenance), the drain valve 27 is opened to discharge the refrigerant 25 in the cooling tank 24 outside therefrom. Further, a substantially L-shaped inlet gas communication tube 5 and a substantially I-shaped outlet gas communication tube 7 are inserted in each adsorption/desorption column 4 in a vertical direction from above. The inlet gas communication tube 5 penetrates the silica gel 6 to the lower portion, and the outlet gas communication tube 7 penetrates up to the portion above the high-purity silica gel 6, not reaching the silica gel 6. Thus, an L-shaped gas introduction port at a lower end of the inlet gas communication tube 5 and a discharge port at a lower end of the outlet gas communication tube 7 are placed with the silica gel 6 interposed therebetween. Further, each inlet gas communication tube 5 is provided with three inlet valves 8, 9, and 10. Further, each outlet gas communication tube 7 is provided with three outlet valves 11, 12, and 13.

An ozone generator 3 and an oxygen bomb 1 are provided outside the cooling tank 24, and the oxygen bomb 1 is connected to the ozone generator 3 via a pressure-reducing valve 2. Ozone is generated by feeding oxygen from the oxygen bomb 1 to the ozone generator 3 and supplied to the adsorption/desorption column 4. The ozone generator 3 may be the one that is currently used generally as an ozone generating device. Further, an ozone-using facility 17 is provided outside the cooling tank 24 and supplied with ozone of high concentration generated by the adsorption/desorption column 4. The ozone-using facility 17 is provided with a vacuum pump 22 for reducing the pressure of the ozone-using facility 17.

The ozone generator 3 is communicated with the silica gel 6 in the adsorption/desorption column 4 via an inlet valves 10 and the inlet gas communication tube 5. Further, the silica gel 6 is communicated with an ozone-decomposing catalyst 19 via the outlet gas communication tube 7, an outlet valve 13, an automatic pressure adjuster 18, and an ozone concentration meter 28, all of which are connected so as to adsorb ozone.

Further, each adsorption/desorption column 4 is connected to the ozone-decomposing catalyst 21 by way of the outlet gas communication tube 7, the outlet valve 12, and the vacuum pump 20 via the inlet valve 9 provided at the inlet gas communication tube 5 of another adsorption/desorption column 4 through another adsorption/desorption column 4 and via the outlet gas communication tube 7 and the outlet valve 11 provided in another adsorption/desorption column 4.

Further, each adsorption/desorption column 4 is connected to the ozone-using facility 17 and the vacuum pump 22 through the inlet gas communication tube 5, the inlet valve 8, the vacuum pump 15, the flow rate adjusting unit (mass-flow controller) 16, and the ozone concentration meter 29.

As described above, the ozone concentrator according to Embodiment 1 of the present invention includes an ozone generator 3 that generates ozone from oxygen, a plurality of adsorption/desorption columns 4 in which the silica gel 6 that is an ozone adsorbent cooled with the certain-temperature refrigerant 25 is packed so as to concentrate ozone generated by the ozone generator 3, a refrigerating machine 23 that is cooling means for cooling the refrigerant 25, the vacuum pump 20 connected to the adsorption/desorption columns 4 for discharging mainly oxygen from the silica gel 6 adsorbing the ozone, thereby concentrating the ozone in the adsorption/desorption columns 4, a plurality of valves 8 to 13 for air pressure operations, connected to the adsorption/desorption columns 4, for switching passages of gas that is to flow in or flow out with respect to the adsorption/desorption columns 4, and ozone concentration meters 28, 29 for measuring the concentration of the ozone concentrated by the vacuum pump 20, in which a discharge line of the vacuum pump 20 that concentrates the ozone in one of the adsorption/desorption columns 4 in which the silica gel 6 is packed is allowed to pass through another one of the adsorption/desorption columns 4 again. In this configuration, the three adsorption/desorption columns 4 repeatedly perform the adsorption step of adsorbing ozone, the vacuum discharging step of discharging adsorbed ozone in vacuum to enhance the concentration of ozone gas, and the ozone desorption step of sending out the concentrated ozone, thereby adsorbing ozone again, the concentration of which does not reach a predetermined concentration and which used to be discarded conventionally. Thus, ozone is concentrated to a predetermined ozone concentration in a range of 30 to 100% by volume, required by an ozone-using facility, and can be used.

Next, the operation of the ozone concentrator according to Embodiment 1 of the present invention is described. Oxygen is fed in the ozone generator 3 from the oxygen bomb 1 to generate ozone. The ozone is first placed in the adsorption/desorption column 4-1 through the inlet valve 10-1 and the inlet gas communication tube 5-1, and is adsorbed by the silica gel 6-1 in the adsorption/desorption column 4-1 cooled via the refrigerant 25 cooled by the refrigerating machine 23. The gas having adsorbed the ozone and a part of oxygen is released to the atmosphere through the outlet gas communication tube 7-1, the outlet valve 13-1, the automatic pressure adjuster 18, the ozone concentration meter 28, and the ozone-decomposing catalyst 19. As the partial pressure of ozone is higher, the gas adsorbs the ozone more. Therefore, during ozone adsorption, a gauge pressure is adjusted to 0.1 MPa or more by the automatic pressure adjuster 18. After the completion of the adsorption, the inlet valve 10-1 and the outlet valve 13-1 are closed to place the adsorption/desorption column 4-1 in a suspended state temporarily. Then, the inlet valve 10-2 and the outlet valve 13-2 provided with respect to the adsorption/desorption column 4-2 are opened, whereby the silica gel 6-2 in the adsorption/desorption column 4-2 is allowed to adsorb ozone.

The silica gel 6-1 in the adsorption/desorption column 4-1 simultaneously adsorbs oxygen together with ozone. In order to increase the concentration of the adsorbed ozone, it is necessary to discharge the oxygen. Therefore, the outlet valve 12-1 of the adsorption/desorption column 4-1 that is suspended temporarily is opened, and the adsorbed oxygen is discharged from the silica gel 6-1 with the vacuum pump 20 via the outlet valve 12-1, whereby ozone is concentrated. This is referred to as a pressure-reducing operation. When the oxygen is discharged, a part of the ozone is discharged simultaneously together with the oxygen. Therefore, the ozone discharged from the adsorption/desorption column 4-1 is placed in the adsorption/desorption column 4-2 through the outlet valve 12-1, the vacuum pump 20, the inlet valve 9-2, and the inlet gas communication tube 5-2, whereby the ozone is allowed to be adsorbed in the adsorption/desorption column 4-2 again. Thus, ozone flows through the vacuum pump 20, which makes it necessary that the vacuum pump 20 has high corrosion resistance to ozone, and hence, a vacuum pump using a diaphragm made of Teflon (Registered Trademark) is used. The concentration of ozone leaking from the adsorption/desorption column 4-1 is monitored by the ozone concentration meter 28, and the evacuation start time (desorption start time) of the adsorption/desorption column 4-1 is previously set so that the breakthrough of the silica gel 6-2 in the measured adsorption/desorption column 4-2 and the achievement of a predetermined product ozone concentration, which is previously set, by the ozone in the adsorption/desorption column 4-1 are completed simultaneously. More specifically, the period in which the discharge gas discharged from the adsorption/desorption column 4-1 by the vacuum pump 20 is allowed to pass through another adsorption/desorption column 4-2 and adsorbed is set to a period from the start of the discharge from the adsorption/desorption column 4-1 by the vacuum pump 20 to the achievement of a predetermined product ozone concentration by the ozone in the adsorption/desorption column 4-1. When the ozone in the adsorption/desorption column 4-1 achieves the predetermined product ozone concentration, the inlet valve 8-1 is opened, the flow rate is controlled to be constant by the flow rate adjuster (mass-flow controller) 16 through the vacuum pump 15, and the ozone is sent to the ozone-using facility 17 that is in a reduced pressure state by the vacuum pump 22 through the ozone concentration meter 29. This operation is referred to as a desorption operation. The product ozone concentration is a predetermined concentration that is previously set in a range of 30 to 100% by volume required by the ozone-using facility 17. Table 1 illustrates a series of adsorption, reduction in pressure, and desorption and the operation of each valve.

TABLE 1

| | 30 minutes | 30 minutes | 30 minutes | 30 minutes | 30 minutes | 30 minutes | 30 minutes | 30 minutes | 30 minutes | 30 minutes | 30 minutes | 30 minutes | 30 minutes |
|---|---|---|---|---|---|---|---|---|---|---|---|---|---|
| Column 4-1 | Adsorption | Suspension | Reduction in pressure | Desorption | Desorption | Adsorption | Adsorption | Suspension | Reduction in pressure | Desorption | Desorption | Adsorption | Adsorption |
| Column 4-2 | Suspension | Adsorption | Adsorption | Suspension | Reduction in pressure | Desorption | Desorption | Adsorption | Adsorption | Suspension | Reduction in pressure | Desorption | Desorption |
| Column 4-3 | Suspension | Suspension | Suspension | Adsorption | Adsorption | Suspension | Reduction in pressure | Desorption | Desorption | Adsorption | Adsorption | Suspension | Reduction in pressure |
| Valves 10-1, 13-1 | Open | Close | Close | Close | Close | Open | Open | Close | Close | Close | Close | Open | Open |
| Valves 10-2, 13-2 | Close | Open | Open | Close | Close | Close | Close | Open | Open | Close | Close | Close | Close |
| Valves 10-3, 13-3 | Close | Close | Close | Open | Open | Close | Close | Close | Close | Open | Open | Close | Close |
| Valves 12-1, 9-2, 11-2 | Close | Close | Open | Close | Close | Close | Close | Close | Open | Close | Close | Close | Close |
| Valves 12-2, 9-3, 11-3 | Close | Close | Close | Close | Open | Close | Close | Close | Close | Close | Open | Close | Close |
| Valves 12-3, 9-1, 11-1 | Close | Close | Close | Close | Close | Close | Open | Close | Close | Close | Close | Close | Open |

TABLE 1-continued

|  | 30 minutes | 30 minutes | 30 minutes | 30 minutes | 30 minutes | 30 minutes | 30 minutes | 30 minutes | 30 minutes | 30 minutes | 30 minutes | 30 minutes | 30 minutes |
|---|---|---|---|---|---|---|---|---|---|---|---|---|---|
| Valve 8-1 | Close | Close | Close | Open | Open | Close | Close | Close | Close | Open | Open | Close | Close |
| Valve 8-2 | Close | Close | Close | Close | Close | Open | Open | Close | Close | Close | Close | Open | Open |
| Valve 8-3 | Close | Close | Close | Close | Close | Close | Close | Open | Open | Close | Close | Close | Close |

Figure 2:
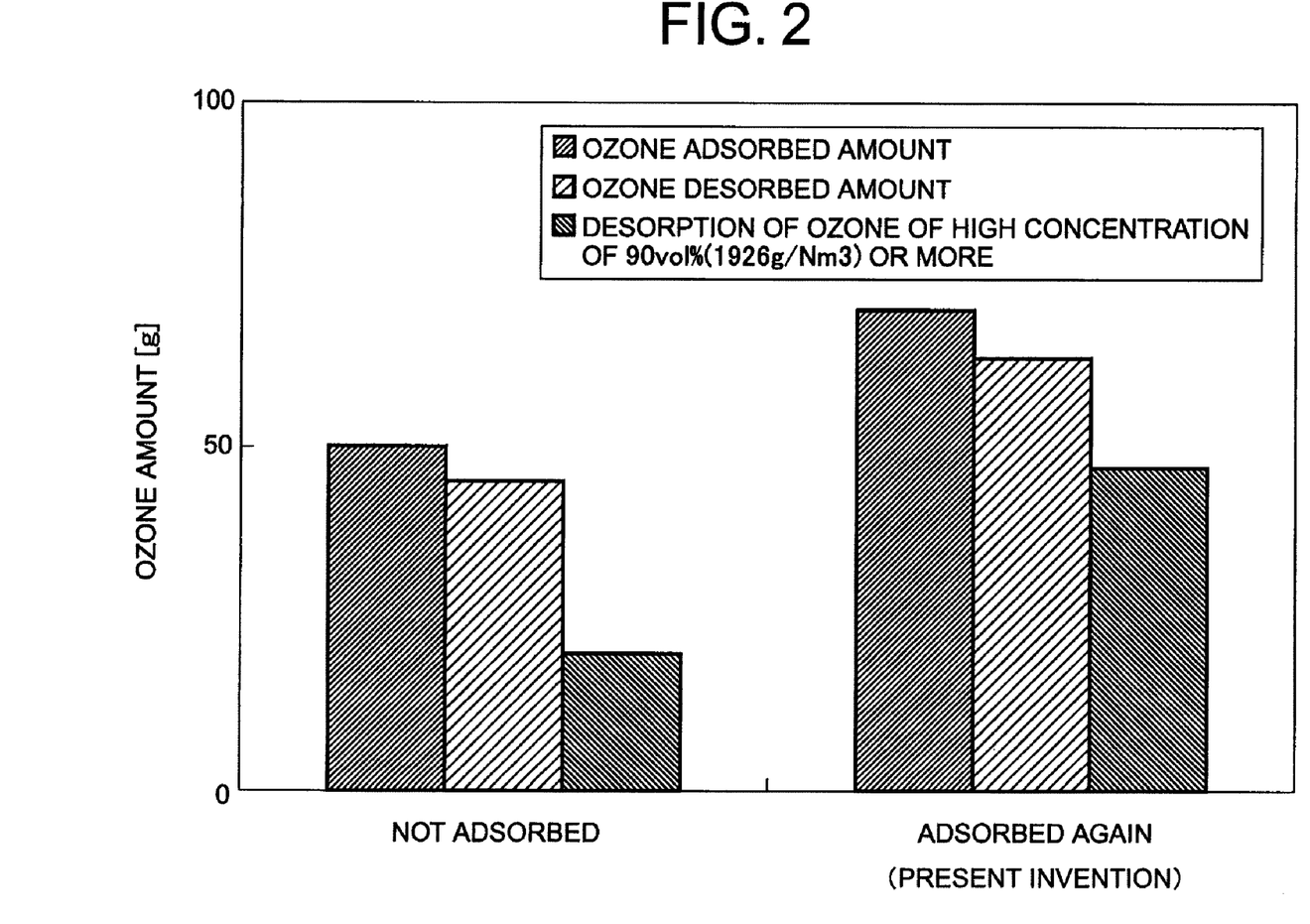
FIG. 2 An explanatory view comparing by a graph the amount of ozone generated by the ozone concentrator according to Embodiment 1 of the present invention with the conventional amount.

FIG. 2 is a graph illustrating the ozone adsorption amount, the amount of desorbed ozone, and the amount of ozone of a concentration of 90% by volume or more in the desorbed ozone, when the temperature of the refrigerant 25 is set to be constant at −60° C. In the figure, three bars on the left side illustrate the case where ozone is not adsorbed again, and three bars on the right illustrate the case where ozone is adsorbed again according to Embodiment 1. In each case, the bar at the left represents the ozone adsorption amount, the center bar represents the ozone desorption amount, and the bar at the right illustrates the value of the desorption amount of ozone of a concentration of 90% by volume or more.

Thus, in this embodiment, ozone, which used to be discharged conventionally and the concentration of which has not reached a product gas concentration, is placed in another adsorption/desorption column 4 and adsorbed again, whereby the adsorption amount of ozone increases, the power for ozone generation due the increase in use efficiency of ozone decreases, and ozone with a high partial pressure can be adsorbed by gas. Therefore, silica gel can adsorb ozone at a high density, which facilitates the concentration of ozone. In Embodiment 1, in the case where there is a sufficient room for a discharge amount and a vacuum achievement of the vacuum pump 22, even if the vacuum pump 15 is eliminated, the vacuum pump 22 belonging to the ozone-using facility 17 is used, and the adsorption/desorption of the adsorption/desorption column 4 is performed, the same effects can be exhibited. Further, the configuration of switching three columns has been described above. However, three units may be switched with a plurality of columns being set to be one unit. Even in such a case, the same effects can be obtained.

As described above, in the ozone concentrator according to this embodiment, ozone generated by the ozone generator 3 is adsorbed by the silica gel 6-1 packed in the adsorption/desorption column 4-1 cooled by the refrigerating machine 23. After that, the ozone is discharged through the vacuum pump 20 and the gas discharged by the vacuum pump 20 is distributed through the communicated adsorption/desorption column 4-2 through which the ozone gas breaks. Therefore, the following effects are obtained.

First, it is not necessary to heat silica gel by taking out ozone gas concentrated through the vacuum pump at a predetermined temperature, and hence the energy and time for heating can be saved. Second, the adsorption/desorption column through which ozone breaks is allowed to adsorb ozone gas of high concentration discharged in vacuum from the adsorption/desorption column. Therefore, the use efficiency of ozone is enhanced and the concentration ratio is increased, which can save the generation amount of ozone, and reduce the energy for generating ozone. Third, the discharge line of the vacuum pump is connected to another adsorption/desorption column in the adsorption process. Therefore, the adsorption rate and adsorption amount are proportional to the ozone concentration, and hence, ozone of high concentration coming out of the discharge line of the vacuum pump is adsorbed, whereby the adsorption is fast, and ozone of concentration higher than that of ozone generated from the ozone generator can be adsorbed, whereby the adsorption amount can be increased.

Embodiment 2

Figure 3:
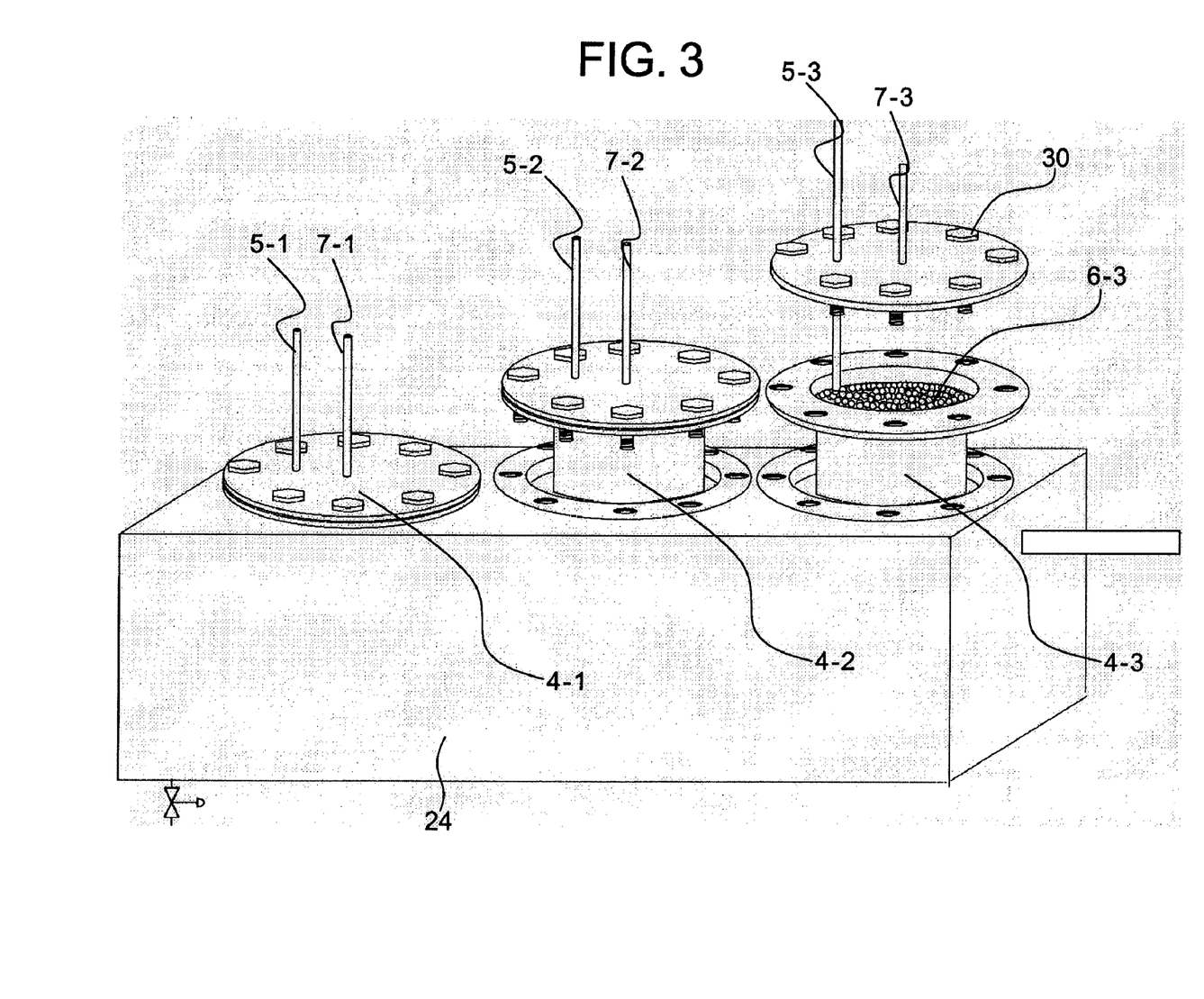
FIG. 3 A partial perspective view illustrating main portions of an ozone concentrator according to Embodiment 2 of the present invention.

FIG. 3 is a view illustrating an ozone concentrator according to Embodiment 2 of the present invention. The inlet gas communication tube 5 and the outlet gas communication tube 7 are inserted in the adsorption/desorption columns 4-1 to 4-3 from above, the inlet gas communication tube 5 penetrates the silica gel 6 to a lower portion thereof, and a gas introduction port of the communication tube 5 and a gas discharge port of the communication tube 7 are placed with the silica gel 6 interposed therebetween. The adsorption/desorption columns 4-1 to 4-3 are attached to the cooling tank 24 with a plurality of bolts 30. The respective upper ends of the inlet gas communication tube 5 and the outlet gas communication tube 7 outside the adsorption/desorption column 4 are placed on the same side of the adsorption/desorption column 4, and the respective lower ends placed inside the adsorption/desorption column 4 sandwich the silica gel 6, and hence, ozone gas is likely to be adsorbed. Further, the adsorption/desorption column 4 is attached to the cooling tank 24 with the bolts 30, and hence, the adsorption/desorption column 4 and the cooling tank 24 can be separated. Therefore, the adsorption/desorption column 4 can be exchanged without discharging a refrigerant 25 from the cooling tank 24. Thus, the weight of the entire ozone concentrator becomes small, and only the adsorption/desorption column 4 can be attached/detached, which facilitates maintenance. The remaining configuration is the same as that of Embodiment 1 described above, and hence the description thereof is omitted here.

Figure 4:
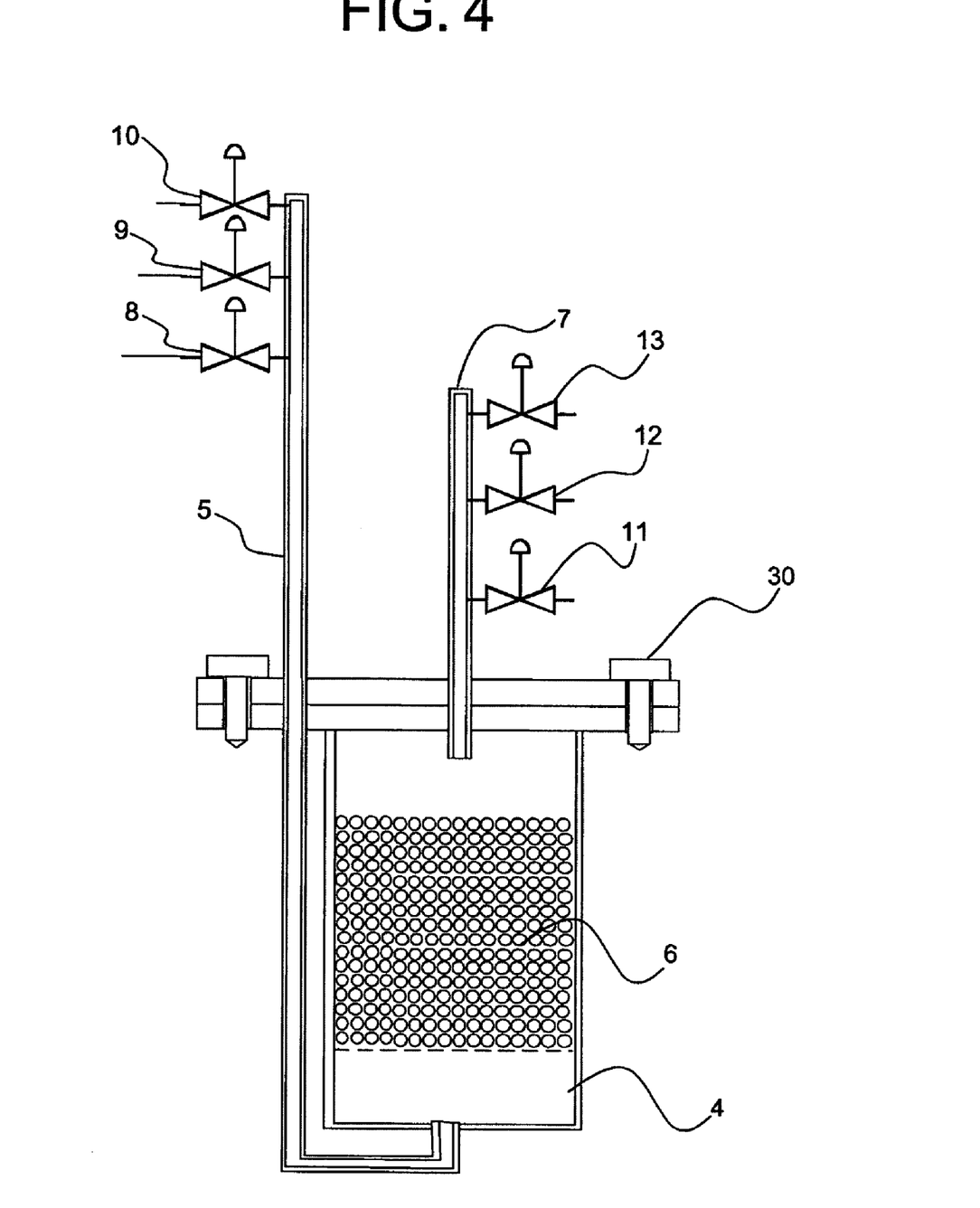
FIG. 4 A partial cross-sectional view illustrating main portions of the ozone concentrator according to Embodiment 2 of the present invention.

In Embodiment 2, although an example has been described in which the inlet gas communication tube 5 penetrates the silica gel 6, the present invention is not limited thereto. The inlet gas communication tube 5 passes through the outside of the adsorption/desorption column 4 to sandwich the outlet gas communication tube 7 and the silica gel 6, as illustrated in FIG. 4, and the same effects can be obtained even in this case.

As described above, according to Embodiment 2, the adsorption/desorption columns 4-1 to 4-3 are attached to the cooling tank 24 with the bolts 30, and hence the adsorption/desorption column 4 and the cooling tank 24 can be separated from each other. Therefore, the adsorption/desorption column 4 can be exchanged without pulling the refrigerant 25 from the cooling tank 24, and only the adsorption/desorption column 4 can be attached/detached, which facilitates maintenance.

Embodiment 3

Figure 5:
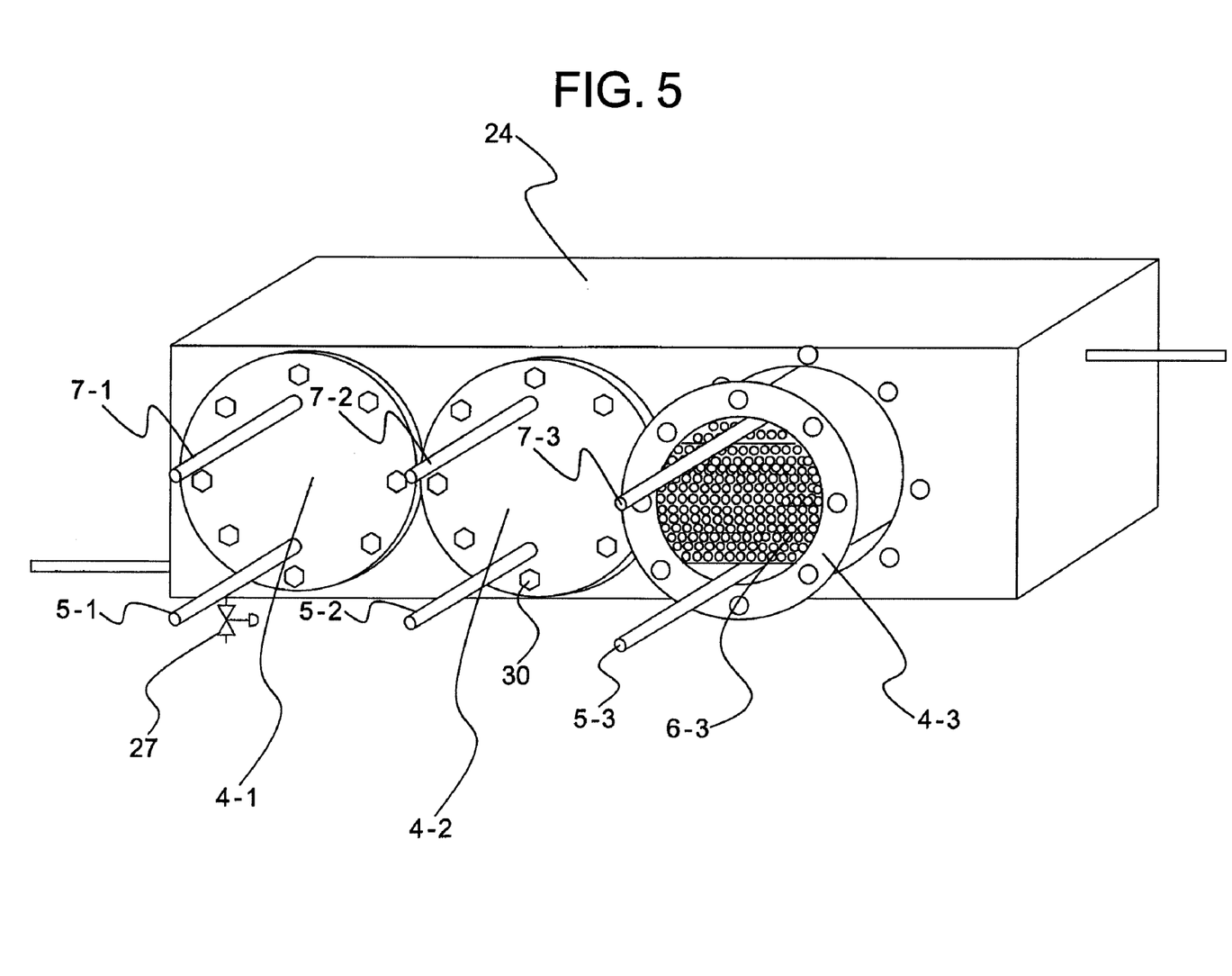
FIG. 5 A partial perspective view illustrating main portions of an ozone concentrator according to Embodiment 3 of the present invention.

FIG. 5 is a view illustrating an ozone concentrator according to Embodiment 3 of the present invention. As illustrated in FIG. 5, the adsorption/desorption column 4 is inserted so as to be directed horizontally in the cooling tank 24 from a side surface of the cooling tank 24 and attached to the side surface with bolts 30. The configuration of the adsorption/desorption column 4 itself is basically the same as those illustrated in Embodiments 1 and 2. However, in this embodiment, the adsorption/desorption column 4 is placed horizontally, and hence, the silica gel 6 is positioned in a center portion in a height direction (including a diameter in a horizontal direction) in the adsorption/desorption column 4, and is placed while gaps are provided only in upper and lower portions in the adsorption/desorption column 4. In the center portion (excluding the gaps), the silica gel 6 is in close contact with the inner wall of the adsorption/desorption column 4. Further, the outlet gas communication tube 7 is inserted in the gap in the upper portion in the adsorption/desorption column 4, and the inlet gas communication tube 5 enters through the gap in the lower portion in the adsorption/desorption column 4 so that its tip end is set in the center portion in a depth direction, whereby the silica gel 6 is allowed to adsorb/desorb ozone. The remaining configuration is the same as that in Embodiment 1 or 2 described above, and hence, the description thereof is omitted here.

Thus, the adsorption/desorption column 4 can function in the same way as in Embodiment 1 even provided horizontally. However, in this embodiment, the adsorption/desorption column 4 is inserted in the side surface of the cooling tank 24, while being directed horizontally, and hence the refrigerant 25 spills during maintenance. Therefore, the refrigerant 25 is previously discharged from the cooling tank 24 with a drain valve 27 attached to the cooling tank 24, whereby the adsorption/desorption column 4 is replaced. The remaining operation is the same as that in Embodiment 1 described above, and hence, the description thereof is omitted here.

As described above, in Embodiment 3, the adsorption/desorption column 4 is attached from the side surface of the cooling tank 24, and hence it is not necessary to take a maintenance space in the upper portion of the adsorption/desorption column 4, which can facilitate maintenance.

Embodiment 4

Figure 6:
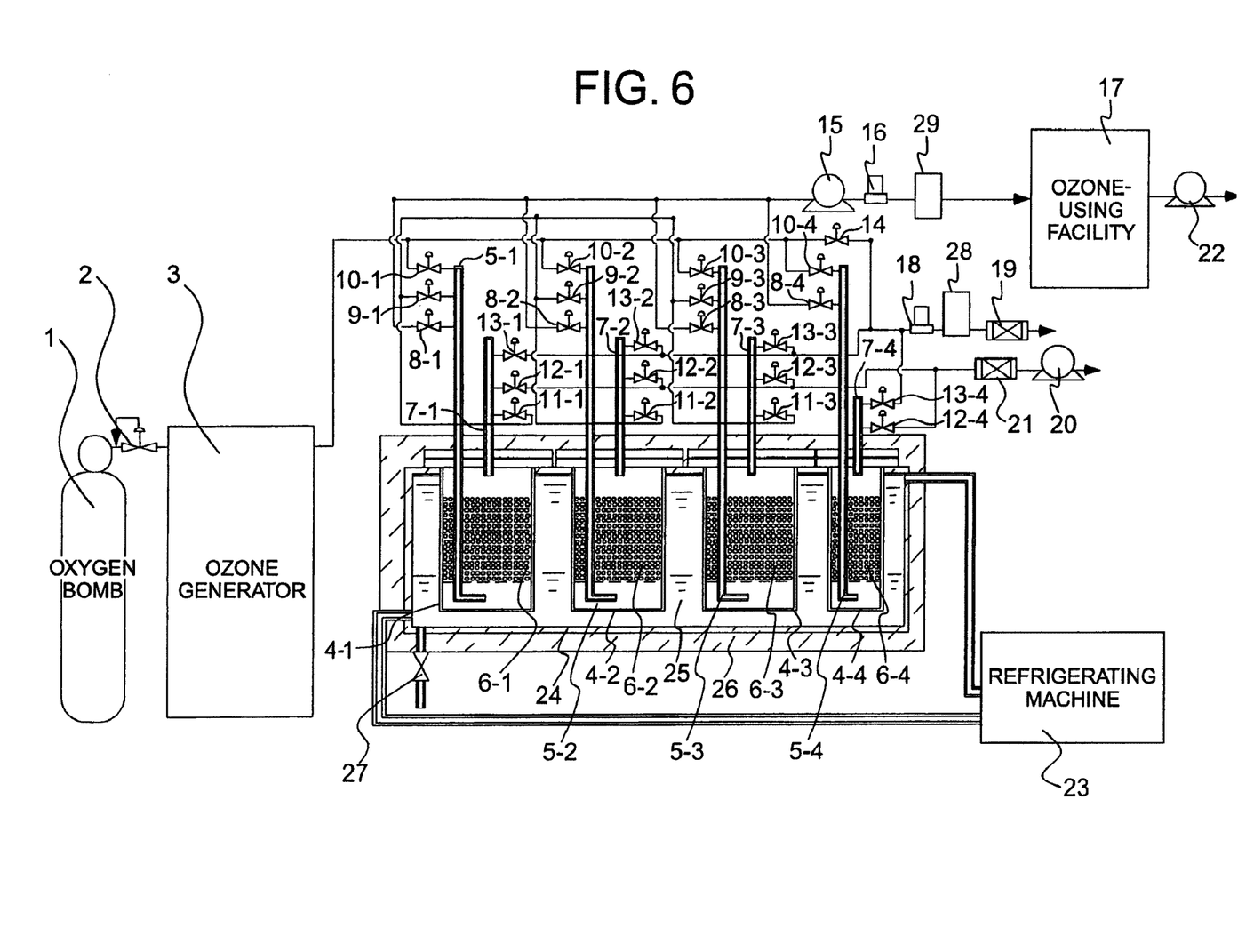
FIG. 6 A structural view illustrating a configuration of an ozone concentrator according to Embodiment 4 of the present invention.

FIG. 6 is a view illustrating an ozone concentrator according to Embodiment 4 of the present invention. In addition to the three adsorption/desorption columns 4-1, 4-2, and 4-3 of the same size, the fourth adsorption/desorption column 4-4, which is smaller than the three adsorption/desorption columns 4-1, 4-2, and 4-3, is provided. The inlet gas communication tube 5-4 and the outlet gas communication tube 7-4 are inserted in the adsorption/desorption column 4-4 in the same way as in the adsorption/desorption columns 4-1, 4-2, and 4-3. Further, two inlet valves 8-4 and 10-4 are provided at the inlet gas communication tube 5-4, and two outlet valves 12-4 and 13-4 are provided at the outlet gas communication tube 7-4.

The four adsorption/desorption columns 4 are provided in the cooling tank 24 covered with the heat-insulating material 26. Further, the silica gel 6 is placed in the four adsorption/desorption columns 4, which are connected so as to adsorb ozone serially with the ozone generator 3, the inlet valve 10, the outlet valve 13, the automatic pressure adjuster 18, an ozone concentration meter 28, and the ozone-decomposing catalyst 19. The adsorption/desorption column 4-1 is connected to the adsorption/desorption column 4-2 through the outlet valve 11-1 and the inlet valve 9-2, and is connected to the vacuum pump 20 through the valve 12-2 and the ozone-decomposing catalyst 21. Similarly, the adsorption/desorption column 4-2 is connected to the adsorption/desorption column 4-3 through the outlet valve 11-2 and the inlet valve 9-3, and is connected to the vacuum pump 20 through the outlet valve 12-3 and the ozone-decomposing catalyst 21. The adsorption/desorption column 4-3 is connected to the adsorption/desorption column 4-1 through the outlet valve 11-3 and the inlet valve 9-1, and is connected to the vacuum pump 20 through the valve 12-1 and the ozone-decomposing catalyst 21. The adsorption/desorption column 4-4 is connected to the vacuum pump 20 through the outlet valve 12-4 and the ozone-decomposing catalyst 21. Further, the adsorption/desorption columns 4 are connected to the ozone-using facility 17 and the vacuum pump 22 through the inlet valve 8, the vacuum pump 15, the flow rate adjuster (mass-flow controller) 16, and the ozone concentration meter 29. The refrigerant 25 cooled by the refrigerating machine 23 circulates in the cooling tank 24. The remaining configuration is the same as that of Embodiment 1.

Next, description is made of the operation. Oxygen is fed in the ozone generator 3 from the oxygen bomb 1 to generate ozone. The ozone is adsorbed through the inlet valve 10-1 and the communication tube 5-1 by the silica gel 6-1 cooled via the refrigerant 25 cooled to −50° C. or less by the refrigerating machine 23. The gas having adsorbed the ozone and a part of oxygen is released to the atmosphere through the outlet gas communication tube 7-1, the outlet valve 13-1, the automatic pressure adjuster 18, the automatic concentration meter 28, and the ozone-decomposing catalyst 19. As the partial pressure of ozone is higher, the ozone is adsorbed more. Therefore, during ozone adsorption, a gauge pressure is adjusted to 0.1 MPa or more by the automatic pressure adjuster 18. After the completion of adsorption, the inlet valve 10-1 and the outlet valve 13-1 are closed, and the inlet valve 10-4 and the outlet valve 13-4 are opened, whereby the adsorption/desorption column 4-4 is allowed to adsorb ozone. Simultaneously, the outlet valve 11-1, the inlet valve 9-2, and the outlet valve 12-2 are opened, and vacuum discharging is performed with the vacuum pump 20, whereby ozone in the adsorption/desorption column 4-1 is concentrated. At this time, the adsorption/desorption column 4-2 adsorbs oxygen and ozone discharged simultaneously, and only oxygen from the outlet valve 12-2 is discharged. In the series of operations, when the concentration of ozone in the adsorption/desorption column 4-1 reaches a predetermined concentration, the outlet valve 11-1, the inlet valve 9-2, and the outlet valve 12-2 are closed, and the inlet valve 8-1 is opened, whereby ozone gas with a flow rate controlled by the flow rate adjuster (mass-flow controller) 16 is sent to the ozone-using facility 17 through the vacuum pump 15. At this time, the inlet valve 9-2 and the outlet valve 13-2 are opened, and the inlet valve 9-4 and the outlet valve 13-4 are closed, whereby the adsorption/desorption column 4-2 is allowed to adsorb ozone gas of high purity generated by the ozone generator 3. The concentration of ozone gas adsorbed by the adsorption/desorption column 4-4 increases when the valve 12-4 is opened, and oxygen is discharged through the vacuum pump 20 with the ozone-decomposing catalyst 21. When the concentration reaches a predetermined concentration previously set in a range of 30 to 100% by volume required by the ozone-using facility, the inlet valve 8-4 is opened, and the ozone gas is sent to the ozone-using facility 17 simultaneously with ozone gas of ultra-high concentration coming out of the adsorption/desorption column 4-1. Table 2 illustrates a series of adsorption, reduction in pressure, generation of ozone of high concentration and the operation of each valve.

TABLE 2

| | 20 min. | 20 min. | 20 min. | 20 min. | 20 min. | 20 min. | 20 min. | 20 min. | 20 min. | 20 min. | 20 min. | 20 min. | 20 min. | 20 min. |
|---|---|---|---|---|---|---|---|---|---|---|---|---|---|---|
| Column 4-1 | Adsorption | Adsorption | Adsorption | Reduction in pressure | Desorption | Desorption | Desorption | Desorption | Suspension | Suspension | Suspension | Adsorption of gas under reduced pressure | Adsorption | Adsorption |
| Column 4-2 | Suspension | Suspension | Suspension | Adsorption of gas under reduced pressure | Adsorption | Adsorption | Adsorption | Reduction in pressure | Desorption | Desorption | Desorption | Desorption | Suspension | Suspension |
| Column 4-3 | Suspension | Suspension | Suspension | Suspension | Suspension | Suspension | Suspension | Adsorption of gas under reduced pressure | Adsorption | Adsorption | Adsorption | Reduction in pressure | Desorption | Desorption |
| Column 4-4 | Suspension | Suspension | Suspension | Adsorption | Reduction in pressure | Desorption | Suspension | Adsorption | Reduction in pressure | Desorption | Suspension | Adsorption | Reduction in pressure | Desorption |
| Valves 10-1, 13-1 | Open | Open | Open | Close | Close | Close | Close | Close | Close | Close | Close | Close | Open | Open |
| Valves 10-2, 13-2 | Close | Close | Close | Close | Open | Open | Open | Close | Close | Close | Close | Close | Close | Close |
| Valves 10-3, 13-3 | Close | Close | Close | Close | Close | Close | Close | Close | Open | Open | Open | Close | Close | Close |
| Valves 10-4, 13-4 | Close | Close | Close | Open | Close | Close | Close | Open | Close | Close | Close | Open | Close | Close |
| Valves 11-1, 9-2, 12-2 | Close | Close | Close | Open | Close | Close | Close | Close | Close | Close | Close | Close | Close | Close |
| Valves 11-2, 9-3, 12-3 | Close | Close | Close | Close | Close | Close | Close | Open | Close | Close | Close | Close | Close | Close |
| Valves 11-3, 9-1, 12-1 | Close | Close | Close | Close | Close | Close | Close | Close | Close | Close | Close | Open | Close | Close |
| Valve 12-4 | Close | Close | Close | Close | Open | Close | Close | Close | Open | Close | Close | Close | Open | Close |
| Valve 8-1 | Close | Close | Close | Close | Open | Open | Open | Open | Close | Close | Close | Close | Close | Close |
| Valve 8-2 | Close | Close | Close | Close | Close | Close | Close | Close | Open | Open | Open | Open | Close | Close |
| Valve 8-3 | Close | Close | Close | Close | Close | Close | Close | Close | Close | Close | Close | Close | Open | Open |
| Valve 8-4 | Close | Close | Close | Close | Close | Open | Close | Close | Close | Open | Close | Close | Close | Open |

In Embodiment 1 described above, ozone gas discharged under reduced pressure and gas generated by the ozone generator 3 are adsorbed simultaneously. Therefore, ozone gas discharged under reduced pressure is diluted slightly. On the other hand, as in Embodiment 4, by providing the auxiliary adsorption/desorption column 4-4 and allowing the adsorption/desorption column 4-4 to adsorb the ozone gas discharged under reduced pressure and the ozone gas generated by the ozone generator 3, the ozone partial pressure when ozone gas discharged under reduced pressure is adsorbed again increases, and hence the adsorption amount increases. Further, the auxiliary added adsorption/desorption column 4-4 performs the step of adsorption, reduction in pressure and generation of ozone of high concentration with one column while the other three columns repeat the step of adsorption, reduction in pressure, and generation of ozone of high concentration. Therefore, the capacity of the adsorption/desorption column, i.e., the amount of silica gel may be ⅓.

As described above, according to Embodiment 4, ozone, which used to be discharged conventionally and the concentration of which has not reached a product gas concentration, is placed in another adsorption/desorption column and adsorbed again, whereby the use efficiency of ozone is enhanced. Further, ozone contained in discharge gas is adsorbed by the silica gel 6, and hence, the vacuum pump 20 does not touch ozone, and the ozone-decomposing catalyst 21 with low performance can be used, whereby a safe ozone concentrator of high reliability can be realized. Further, four adsorption/desorption columns in total are provided: three adsorption/desorption columns that repeatedly perform the adsorption step of adsorbing ozone, the vacuum discharging step (pressure-reducing step) of discharging adsorbed ozone in vacuum to enhance the concentration of ozone gas, and the ozone generation step (desorption step) of sending out the generated ozone; and one adsorption/desorption column that performs the adsorption step, the vacuum discharging step, and the ultra-high concentration ozone generation step independently from the above adsorption/desorption columns are provided. Therefore, the ozone gas discharged in vacuum is not diluted, and hence an adsorbent can adsorb ozone at a higher density. Thus, the use efficiency of ozone is enhanced and the power for generating ozone can be reduced.

Further, in Embodiment 4, although the configuration of providing four adsorption/desorption columns has been described, the present invention is not limited thereto. Three units with a plurality of columns being one unit and the fourth unit with less number of columns may be used, and even in this case, the same effects as those in the above can be obtained.

The oxygen gas supplied from the oxygen bomb 1 to the ozone generator 3 described in Embodiments 1 to 4 is desirably pure oxygen with a purity of 99.99% or more, for example. The reason for this is as follows: when oxygen containing no nitrogen or oxygen containing a small amount of nitrogen is used as a material gas for generating ozone, a nitrogen oxide is not generated in generated ozone, and hence, corrosion is not caused in an ozone-using facility.

Further, as silica gel used for adsorbing ozone, it is desired to use silica gel in which the purity of silica (chemical symbol $SiO_2$) is 99.9% or more. This prevents ozone from being decomposed and lost due to the reaction with impurities (particularly, metal components) contained in silica gel, and impurities generated from silica gel can be prevented from being mixed in the generated ozone.

The invention claimed is:

1. An ozone concentrator, comprising:
    an ozone generator;
    a plurality of adsorption/desorption columns in which an ozone adsorbent cooled with a certain-temperature refrigerant for concentrating ozone generated by the ozone generator is packed;
    cooling means for cooling the refrigerant;
    discharging means connected to the plurality of adsorption/desorption columns, for concentrating the ozone in the plurality of adsorption/desorption columns by discharging a discharge gas comprising mainly oxygen from the adsorbent adsorbing the ozone; and
    a plurality of valves connected to the adsorption/desorption columns, for switching passages of gas that is allowed to flow in or flow out with respect to the adsorption/desorption columns,
    wherein said discharging means comprises a discharge line connecting a first adsorption/desorption column to a second adsorption/desorption column and the discharge line obtains the discharge gas from a top portion of the first adsorption/desorption column and passes the discharge gas to a bottom portion of the second adsorption/desorption column, wherein the discharge line is connected on a first end to a top portion of the first adsorption/desorption column and on a second end to a bottom portion of the second adsorption/desorption column.

2. An ozone concentrator according to claim 1, wherein an aspiration line of the discharging means is connected to one of the plurality of adsorption/desorption columns in which adsorption has been completed.

3. An ozone concentrator according to claim 1, wherein a period in which the discharge gas discharged from the one of the plurality of adsorption/desorption columns by the discharging means is allowed to pass through the another one of the plurality of adsorption/desorption columns and adsorbed again is set to a period from start of discharge from the one of the plurality of adsorption/desorption columns by the discharging means to achievement of a predetermined product ozone concentration by the ozone in the one of the plurality of adsorption/desorption columns.

4. An ozone concentrator according to claim 1, wherein the adsorption/desorption columns comprise:
    three adsorption/desorption columns that adsorb ozone, a vacuum that discharges the adsorbed ozone in vacuum to enhance a concentration of ozone, and a discharge line which desorps the concentrated ozone; and
    one adsorption/desorption column that performs the adsorption, the vacuum discharging, and the ozone desorption independently from the three adsorption/desorption columns.

5. An ozone concentrator according to claim 1, wherein oxygen with a purity of 99.99% or more is used as a material gas for the ozone generator.

6. An ozone concentrator, comprising:
    an ozone generator;
    a plurality of adsorption/desorption columns in which an ozone adsorbent cooled with a certain-temperature refrigerant for concentrating ozone generated by the ozone generator is packed;
    a refrigerating machine for cooling the refrigerant;
    a vacuum pump connected to the plurality of adsorption/desorption columns, for concentrating the ozone in the plurality of adsorption/desorption columns by discharging a discharge gas comprising mainly oxygen from the adsorbent adsorbing the ozone; and
    a plurality of valves connected to the adsorption/desorption columns, for switching passages of gas that is allowed to flow in or flow out with respect to the adsorption/desorption columns,
    wherein the vacuum pump comprises a discharge line connecting a first adsorption/desorption column to a second adsorption/desorption column and the discharge line obtains the discharge gas from a top portion of the first adsorption/desorption column and passes the discharge gas to a bottom portion of the second adsorption/desorption column, wherein the discharge line is connected on a first end to a top portion of the first adsorption/desorption column and on a second end to a bottom portion of the second adsorption/desorption column.

7. An ozone concentrator according to claim 6, wherein an aspiration line of the vacuum pump is connected to one of the plurality of adsorption/desorption columns in which adsorption has been completed.

8. An ozone concentrator according to claim 6, wherein a period in which the discharge gas discharged from the one of the plurality of adsorption/desorption columns by the vacuum pump is allowed to pass through the another one of the plurality of adsorption/desorption columns and adsorbed again is set to a period from start of discharge from the one of the plurality of adsorption/desorption columns by the vacuum pump to achievement of a predetermined product ozone concentration by the ozone in the one of the plurality of adsorption/desorption columns.

9. An ozone concentrator according to claim 6, wherein the adsorption/desorption columns comprise:
   three adsorption/desorption columns that adsorb ozone, a vacuum that discharges the adsorbed ozone in vacuum to enhance a concentration of ozone, and a discharge line which desorps the concentrated ozone; and
   one adsorption/desorption column that performs the adsorption, the vacuum discharging, and the ozone desorption independently from the three adsorption/desorption columns.

10. An ozone concentrator according to claim 6, wherein oxygen with a purity of 99.99% or more is used as a material gas for the ozone generator.

* * * * *